(12) United States Patent
Passova

(10) Patent No.: US 6,671,874 B1
(45) Date of Patent: Dec. 30, 2003

(54) UNIVERSAL VERIFICATION AND VALIDATION SYSTEM AND METHOD OF COMPUTER-AIDED SOFTWARE QUALITY ASSURANCE AND TESTING

(76) Inventor: Sofia Passova, 178 Alfred Ave., Toronto, Ontario (CA), M2N 3J2

( * ) Notice: Subject to any disclaimer, the term of this patent is extended or adjusted under 35 U.S.C. 154(b) by 0 days.

(21) Appl. No.: 09/541,507

(22) Filed: Apr. 3, 2000

(51) Int. Cl.$^7$ ................................................ G06F 9/44
(52) U.S. Cl. ...................................................... 717/126
(58) Field of Search ................................ 717/124–135, 717/162–166; 714/25–41

(56) References Cited

U.S. PATENT DOCUMENTS

| | | | | |
|---|---|---|---|---|
| 4,866,605 A | | 9/1989 | Nakano et al. ............. 364/200 |
| 5,257,363 A | * | 10/1993 | Shapiro et al. ............... 703/13 |
| 5,544,308 A | * | 8/1996 | Giordano et al. ............. 714/26 |
| 5,745,675 A | * | 4/1998 | Herbig et al. ................. 714/38 |
| 6,038,378 A | * | 3/2000 | Kita et al. ..................... 714/38 |
| 6,119,125 A | * | 9/2000 | Gloudeman et al. .... 707/103 R |
| 6,173,440 B1 | * | 1/2001 | Darty ......................... 717/130 |
| 2002/0120921 A1 | * | 8/2002 | Coburn et al. .............. 717/140 |

* cited by examiner

Primary Examiner—Kakali Chaki
Assistant Examiner—Tuan Anh Vu
(74) Attorney, Agent, or Firm—Fasken Martineau DuMoulin; Neil Henderson; Kevin A. O'Neil

(57) ABSTRACT

A method of developing a model of a computer program represents the system requirement conditions and events as a set of positions and transitions, maps the system requirements in a table of positions with position and optionally transition designations, tags one or more significant positions in the including any conditional positions, and creates a reference designation associating alternative conditions with their respective conditional positions. A universal software test development method can be applied to the model by mapping the conditions to a set of positions including a starting position which has no input, a terminal position which has no output, and intermediate positions between the starting position and the terminal position, and generating from the set of positions a table of positions, associating each positions with an expression of the position representing the corresponding system requirements. Both the model development method and the test development method can be implemented automatically by computer software, and the test development method allows for automated development of test documentation. These methods can thus be applied for the verification and validation of computer software.

31 Claims, 7 Drawing Sheets

$A_i$:

|     | $t_1$ | $t_2$ | $t_3$ | $t_4$ | $t_5$ | $t_6$ | $t_7$ | $t_8$ |
|-----|-------|-------|-------|-------|-------|-------|-------|-------|
| $p_1$  | 1 |   |   |   |   |   |   |   |
| $p_2$  |   | 1 |   |   |   |   |   |   |
| $p_3$  |   |   | 1 |   |   |   |   |   |
| $p_4$  |   |   |   | 1 |   |   |   |   |
| $p_5$  |   |   |   |   | 1 |   |   |   |
| $p_6$  |   |   |   |   |   | 1 |   |   |
| $p_7$  |   |   |   |   |   |   | 1 |   |
| $p_8$  |   |   |   |   |   |   |   | 1 |
| $p_9$  |   |   |   |   |   |   |   |   |
| $p_{10}$ |   |   | 1 |   |   |   |   |   |

|     | $t_1$ | $t_2$ | $t_3$ | $t_4$ | $t_5$ | $t_6$ | $t_7$ | $t_8$ |
|-----|-------|-------|-------|-------|-------|-------|-------|-------|
| $p_1$  |   |   |   |   |   |   |   |   |
| $p_2$  | 1 |   |   |   |   |   |   |   |
| $p_3$  |   | 1 |   |   |   |   |   |   |
| $p_4$  |   |   | 1 |   |   |   |   |   |
| $p_5$  |   |   |   | 1 |   |   |   |   |
| $p_6$  |   |   |   |   | 1 |   |   |   |
| $p_7$  |   |   |   |   |   | 1 |   |   |
| $p_8$  |   |   |   |   |   |   | 1 |   |
| $p_9$  |   |   |   |   |   |   |   | 1 |
| $p_{10}$ |   |   |   |   |   |   |   |   |

FIG. 3

| Pos. # | Text Description |
|---|---|
| $p_1$ | Customer inserts the blank card |
| $p_2$ | ATM prompts "Enter the PIN" |
| $p_3$ | Customer enters valid PIN |
| $p_4$ | ATM displays three different choices |
| $p_5$ | Customer selects "Withdrawal" |
| $p_6$ | ATM prompts "Select Amount" |
| $p_7$ | Customer enters valid amount |
| $p_8$ | ATM dispenses cash |
| $p_9$ | ATM ejects the card |
| $p_{10}$ | If customer enters valid PIN |

FIG. 4

$\underline{A_1}$:

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| $p_1$ | 1 | | | | | | | | | | |
| $p_2$ | | 1 | | | | | | | | | |
| $p_3$ | | | 1 | | | | | | | | |
| $p_4$ | | | | 1 | | | | | | | |
| $p_5$ | | | | | 1 | | | | | | |
| $p_6$ | | | | | | 1 | | | | | |
| $p_7$ | | | | | | | 1 | | | | |
| $p_8$ | | | | | | | | 1 | | | |
| $p_9$ | | | | | | | | | | | |
| $p_{10}$ | | | 1 | | | | | | | | |
| $p_{11}$ | | | | | | | | | 1 | | |
| $p_{12}$ | | | | | | | | | | 1 | |
| $p_{13}$ | | | | | | | | | | | 1 |
| $p_{14}$ | | | | | | | | | | | |
| $p_{15}$ | | | | | | | | | 1 | | |

FIG. 5

$\underline{A_0}$:

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| $p_1$ | | | | | | | | | | | |
| $p_2$ | 1 | | | | | | | | | | |
| $p_3$ | | 1 | | | | | | | | | |
| $p_4$ | | | 1 | | | | | | | | |
| $p_5$ | | | | 1 | | | | | | | |
| $p_6$ | | | | | 1 | | | | | | |
| $p_7$ | | | | | | 1 | | | | | |
| $p_8$ | | | | | | | 1 | | | | |
| $p_9$ | | | | | | | | 1 | | | |
| $p_{10}$ | | | | | | | | | | | |
| $p_{11}$ | | 1 | | | | | | | | | |
| $p_{12}$ | | | | | | | | | 1 | | |
| $p_{13}$ | | | | | | | | | | 1 | |
| $p_{14}$ | | | | | | | | | | | 1 |
| $p_{15}$ | | | | | | | | | | | |

FIG. 6

| Pos. # | Text Description |
|---|---|
| $p_1$ | Customer inserts the blank card |
| $p_2$ | ATM prompts "Enter the PIN" |
| $p_3$ | Customer enters valid PIN |
| $p_4$ | ATM displays three different choices |
| $p_5$ | Customer selects "Withdrawal" |
| $p_6$ | ATM prompts "Select Amount" |
| $p_7$ | Customer enters valid amount |
| $p_8$ | ATM dispenses cash |
| $p_9$ | ATM ejects the card |
| $p_{10}$ | If customer enters valid PIN |
| $p_{11}$ | Customer enters invalid PIN |
| $p_{12}$ | ATM displays "The Pin you have entered is invalid" |
| $p_{13}$ | Customer enters invalid PIN |
| $p_{14}$ | ATM ejects the card |
| $p_{15}$ | If customer enters invalid PIN |

FIG. 7

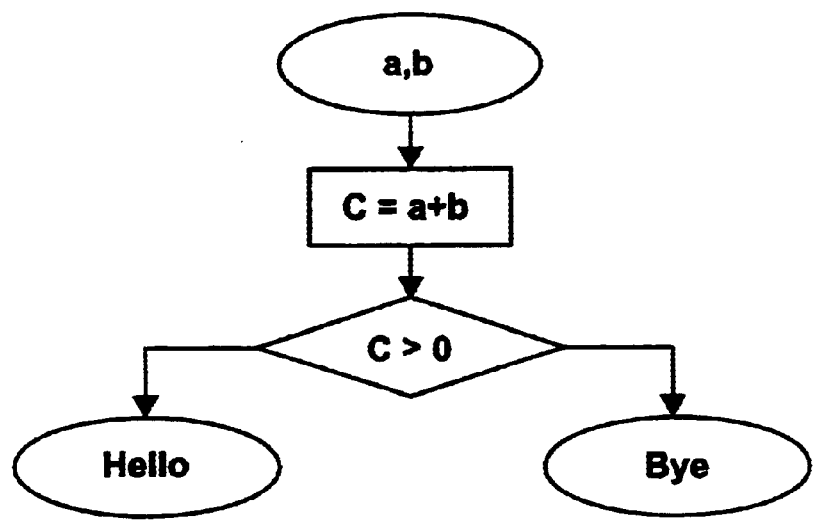

FIG. 8

UNIVERSAL VERIFICATION AND VALIDATION SYSTEM AND METHOD OF COMPUTER-AIDED SOFTWARE QUALITY ASSURANCE AND TESTING

FIELD OF INVENTION

This invention relates to computer programs. In particular, this invention relates to a method of developing and testing computer programs, and computer software for implementing the method.

BACKGROUND OF THE INVENTION

The use of computers for home, commercial, industrial and academic applications has expanded exponentially in the past two decades, to the point where computers are now amongst the most versatile tools known to mankind. In large part this is due to software development, which can be credited for the versatility and complexity of today's myriad computer functions.

The software development life cycle (SDLC) has conventionally consisted of three phases:

1. Determining system requirements through information from the intended user, which typically involves a detailed interrogation of the user to determine the user's objectives, and extrapolation from the developer's understanding of these objectives to determine the desired system behavior under the circumstances contemplated by the end user;
2. Constructing design parameters which most efficiently achieve the system requirements in the context of data entry, data processing and user interface; and
3. Implementing the design requirements by developing program code intended to meet the design parameters. This phase typically concludes with extensive testing of the program code designed to uncover errors introduced during the implementation phase.

This software development methodology was adequate when software engineering was in its infancy, because of the relative simplicity of the software and hardware components of most computer systems. However, it has led to a 'create, develop and test' software development approach, which is unsuitable and inefficient in the context of today's complex computer systems and networks.

This approach to software development presents problems at all three levels.

First, errors are introduced at each phase. Because there is no universally accepted formal language available to describe the system requirements, the system developer's understanding of the user's requirements is subject to the vagaries and ambiguities of the informal language (for example, English) in which the requirements are conveyed. There is no common frame of reference from which it can be determined whether the system requirements are consistent with the user's intent, and invariably due to the diversity of human experience and understanding, in many respects developer's understanding will not be consistent with the user's intent. Thus, errors are introduced into the first phase of software development by inaccurate translation of the user's requirements into system requirements, and these errors are perpetuated throughout the remainder of the SDLC.

Errors are similarly introduced into the design phase, based on the extrapolation of the system requirements into design requirements, again due to the informality of the language used to represent these requirements at both levels. These errors are cumulative with the errors introduced in the system requirements phase, and all of these errors become latent limitations of the system design phase. At this stage none of these errors are manifest, because the end user typically does not participate in the SDLC after the first phase, and the end user has thus not received any feedback which would indicate that the user's requirements have been misunderstood and/or improperly translated into the design level.

Errors are introduced into the implementation phase in the same fashion, so that by the time the creation of the actual program code commences the initial system requirements as contemplated by the user are contaminated by three levels of errors. In a complex computer system, immense time and effort is required to expose and correct these errors, and there is the possibility (in fact, a high probability) that errors will be overlooked and the software will be released for use with errors still in it. This is at best an annoyance to the end user, and at worst can be catastrophic; for example in the case of computer systems for diagnostic or therapeutic use in hospitals, systems controlling functions in nuclear facilities, air traffic control systems etc.

Moreover, computer programs are incapable of resolving inherent inconsistency, incompleteness, incompatibility and ambiguity. These deficiencies can arise at each stage of the SDLC, but the system requirements stage is acutely susceptible to the injection of such errors. The end user may have a detailed understanding of their own requirements, but can rarely anticipate all possible results of any particular data entry or processing scenario, which leads to incompleteness and ambiguity errors; in the design requirements phase it is usually impossible to appreciate all possible ways and environments in which the system will be used, which leads to incompleteness and incompatibility errors; and in complex systems system behavior may be reliant upon thousands or even millions of processing steps, with many possible results, which can lead to ambiguity and inconsistency errors. Complex computer programs are chaotic systems, in which a small error occurring early in a computational process can result in unpredictable and unproductive, or even counterproductive, system behavior.

Rectification of these types of errors often involves creating rectifying code which is designed solely to "undo" the errors, and which has no other legitimate purpose. This serves only to increase the complexity of the system, and is almost entirely a consequence of the 'create, develop and test' approach to software development. The cost and difficulty of rectifying an error in the implementation phase of the SDLC is orders of magnitude greater than the cost and difficulty of rectifying an error in the requirements phase or the design phase of the SDLC. Moreover, identification and rectification of errors in the pre-implementation phases considerably reduces the need for rectifying code in the implementation stage.

The testing of such systems is also problematic. According to conventional software testing methods, an analysis is conducted on the completed computer program and one or more test programs are derived from the original program. Being derivatives of the original program, however, the test programs will necessarily contain the same errors as the original program. Thus, the results of further analysis using these derivative test programs may be satisfactory, or even excellent, but only because the test programs themselves are flawed in the same manner as the original program and therefore latent errors injected into the various stages of the SDLC cannot be detected by the tests. There is no effective way to test the tests, because there is no standard methodology used to create the tests and therefore no way of validating the usefulness of the results.

Moreover, these tests are created on an ad hoc basis by each software developer in the context of the particular computer program under consideration, without regard for the compatibility of the original computer program with software and systems created by other developers. There has heretofore been no widely used verification or validation model which can be applied universally to software created by different developers. These problems are exacerbated by the explosive popularity of the Internet, which endeavors to accommodate software of many different types and platforms. Latent incompatibility problems have become so pervasive as to be commonplace, and are actually expected by most Internet users.

The present invention overcomes these disadvantages by providing a method of modeling a computer program at each stage of the SDLC, and a computer-aided software testing and quality assurance method using a universal verification and validation model which can be applied to any type of software at any stage during the SDLC. The invention also provides software for implementing the verification and validation functions of the invention. The method of the invention provides a means for ensuring and verifying compatibility and fidelity between the original system requirements and the final software product, and for deriving tests which provide an accurate analysis of the system that takes into account the original system requirements. Because the method of the invention can be applied universally to any hardware/software system, its widespread use would also eliminate incompatibility between different software products, platforms and operating systems.

The invention accomplishes this by implementing a validation and verification process in each phase of the SDLC which represents the system requirements as a series of positions and transitions associated with natural language descriptions of the system requirements. In the preferred embodiment this involves creating a formal model of each phase of the SDLC to eliminate intra-phase inconsistencies and ambiguities and ensure completeness and compatibility, before proceeding to the next phase of the SDLC. These models are preferably based on classical Petri nets and variations or extensions thereof. In the preferred embodiment the models created in each phase are cross-reconciled, to eliminate inter-phase degradation by errors which may have been injected in the transition between SDLC phases.

Testing programs for the finished software product are derived both from the parameters at each phase of SDLC model, and from the verification and validation models created at each stage of the SDLC according to the invention, using Petri net analysis techniques. This ensures that analyses of the software product are founded not only in the programmer's conception of the system at the implementation stage, but also on the end user's intended system requirements and the design parameters derived therefrom. The invention accordingly provides a test methodology which incorporates factors extraneous to the finished software product, to generate analyses which bear on the system requirements and the design parameters, and not just intrinsic features of the finished software product.

The invention thus provides methods for automatically generating models representing a computer program and for automatically generating tests of the program.

According to the invention a method of developing a model of a computer program on a system level can be implemented in different ways, depending upon the original representation of the system requirements.

A manual embodiment of the method of model development represents the system requirements, provided in a natural language (such as English), as a set of positions, a set of transitions and a marking vector of an extended Petri net model; maps the system requirements in corresponding tables of positions and transitions with selected transition and position designations; and tags one or more significant positions (or transitions).

In an automatic embodiment of the method of system requirements model development, the system requirements are represented as a table of causes and effects. The system requirements are automatically transferred from this table to an extended Petri net model; mapped from the table of causes and effects to corresponding tables of positions and transitions; and one or more designated significant positions or transitions are tagged.

In an automatic embodiment of the method of model development based on a "Use Case" model, the Use Case is translated to an extended Petri net model as a basic flow of positions and transitions, and alternative flows of positions and transitions connected to positions or transitions in the basic flow. The method maps the system requirements of the basic flow in a table of positions with position designations; tags one or more significant positions in the basic flow including any conditional positions; maps the system requirements of the alternative flows in a table of positions with position designations; and creates a reference designation associating the alternative flows with their respective conditional events in the basic flow.

The modeling process is independent of the method of model development. A marking vector defines the initial conditions of the system, and the modeling process is implemented according to the rules of the selected Petri net variation. The tags provide for external control of the modeling process, allowing for artificial activation of corresponding redundant positions, depending on the portions of the program being modeled, and determine the most critical states for the testing process. The modeling results can then be provided in terms of requirements, which may be expressed in a natural language.

This same modeling method is also used at the design requirements level, for example using algorithms and mathematical expressions, and at the implementation level, for example using algorithms and program code.

The universal automated software testing method of the invention represents the system requirements, design requirements or programs as an extended Petri net model, isolates significant positions by reverse analysis, creates a prototype table of the sequence of states covering the part of the model under consideration, and from the prototype table and table of positions generates tests of a required level expressed in terms of natural language, mathematical expressions or data. These tests can be used for verification and validation, either directly or with some additional information.

For verification of the current level requirements the model representation is tested using tests developed from the previous level. For example, design level requirements are verified using tests generated at the system level. Validation of the software product is effected by conventional testing processes using higher level tests.

In the preferred embodiment the invention also provides tools, comprising universal testing software, for implementing the testing method of the invention.

The present invention thus provides a method of developing a model of a computer program having program code for implementing specified requirements, the method comprising the steps of a. applying position designations to conditions in the requirements, b. mapping the positions in a table of positions relating the position designations to the corresponding conditions; c. identifying one or more significant positions which are positions defining specific points for test development, d. adding as an input to each transition immediately following a significant position a redundant position having no input transition, the state of which controls activation of its output transition, and e. mapping the redundant positions in the table of positions.

The invention further provides a computer program product for use with a computer, the computer program product comprising a computer usable medium having computer readable program code means embodied in said medium for generating a model of a computer program having program code designed to implement specified requirements comprising a series of conditions, each condition having a position designation, and one or more significant positions which are positions defining a segments of the model which can be analyzed, and having added as an input to each transition immediately following a significant position a redundant position having no input transition, the state of which controls activation of its output transition, said computer program product having a. computer readable program code means for mapping the positions in a table of positions relating the position designations to the corresponding conditions, b. computer readable program code means identifying one or more significant positions which are positions defining specific points for test development, and c. computer readable program code means for mapping the redundant positions in the table of positions.

The present invention further provides a method of test development for a computer program having program code and designed to implement requirements comprising conditions and events, to verify concordance between the computer program and the requirements, the method comprising the steps of a. mapping the conditions to a set of positions comprising at least one starting position which has no input, at least one terminal position which has no output, and intermediate positions and transitions connected between the starting position and the terminal position, and b. conducting a reverse analysis of a portion of the requirements from a terminal position to generate from the set of positions a table of positions comprising, in sequence, the terminal position, positions between the terminal position and the starting position, and the starting position, the table comprising an expression of positions representing the corresponding requirements.

A further aspect of the invention includes the method steps of applying transition designations to events in the requirements and mapping the transitions in a table of transitions relating the transition designations to the corresponding events, and computer readable program code means for same.

The invention accordingly provides a unified method for analyzing complex software systems at different levels of system representation, to resolve many quality assurance and testing problems inherent in conventional methodologies.

BRIEF DESCRIPTION OF THE DRAWINGS

In drawings which illustrate by way of example only a preferred embodiment of the invention, FIG. 1 a Petri net model corresponding to the Use Case description of system requirements in Table 2, FIG. 2 is an input matrix of positions versus transitions for the inputs in the Petri net model of FIG. 1 corresponding to the basic flow in the Use Cases model of Table 2, FIG. 3 is an output matrix of positions versus transitions for the outputs in the Petri net model of FIG. 1 corresponding to the basic flow in the Use Cases model of Table 2, FIG. 4 is a table of positions showing system requirements written in natural language and positions in the Petri net model of FIG. 1 for the basic flow in the Use Cases model of Table 2, FIG. 5 is an input matrix of positions versus transitions for the inputs in the Petri net model of FIG. 1 corresponding to the basic flow and alternative flow in the Use Cases model of Table 2, FIG. 6 is an output matrix of positions versus transitions for the outputs in the Petri net model of FIG. 1 corresponding to the basic flow and alternative flow in the Use Cases model of Table 2, FIG. 7 is a table of positions showing system requirements written in natural language and positions in the Petri net model of FIG. 1 for the basic and alternative flows in the Use Cases model of Table 2;

FIG. 8 is a conventional flow chart model of a design level algorithm for a computer program;

DETAILED DESCRIPTION OF THE INVENTION

Figure 1:
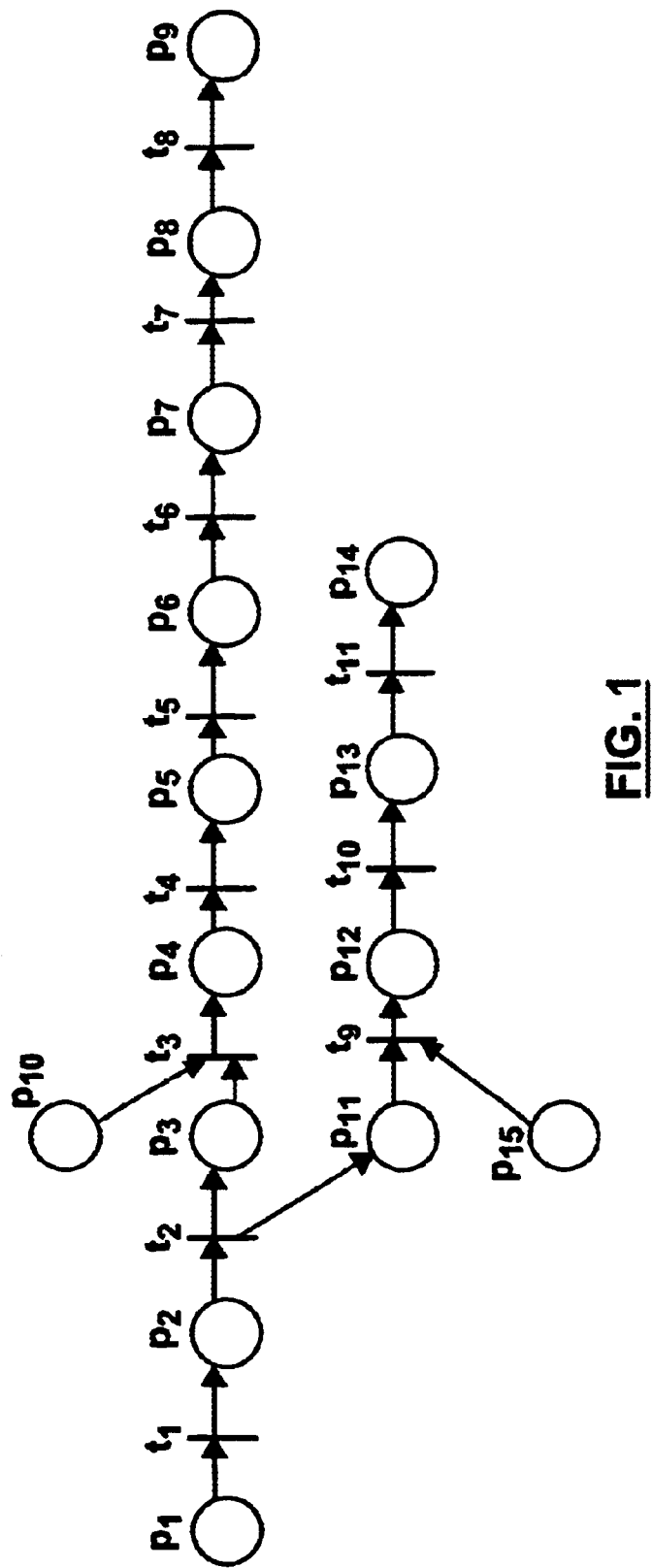

The invention provides a method of modeling system requirements, design requirements and program code for a computer program, and a computer-aided software testing and quality assurance method and software using a universal verification and validation model which can be applied to any type of software modeled according to the invention.

The invention utilizes a variation of Petri net modeling. As is known to those skilled in the art, a Petri net expresses conditions and events as a graph of connected positions and transitions. Petri net positions are marked by an indicator (for example a token) as corresponding conditions satisfied. Depending upon the variation of the Petri net, when one or more input positions are marked the output transition occurs, the indicator is removed from the input position(s) and an indicator is applied to the output position(s). The output position(s) may also be input positions for one or more subsequent transitions, which occur in like fashion. The Petri net thus describes a set of conditions and events occurring when the conditions are satisfied, which may include branches representing alternatives and exceptions, in a graphical form.

The structure of a typical Petri net model, represented by $(P, T, F, M_0)$, is well known to those skilled in the art. A generalized Petri net model can be expressed as $(P', T', F', M_0')$, representing a set of position types $P'=P^1 \cup P^i \cup \ldots \cup P^r$; transition types $T'=T^1 \cup T^i \cup \ldots \cup T^r$; arc types $F'=F^1 \cup F^i \cup \ldots \cup F^r$ and initial marking types $M_0'=M_0^1 \cup M_0^i \cup \ldots \cup M_0^r$, where r=number of variants included in the extended Petri net, $P^i$ is a set of positions $p_i$ of variant type i, $T^i$ is a set of transitions $t_i$ of variant type i, $F^i$ is set of arcs $f_i$ of variant type i connecting positions and transitions, and $M_0{}^i$ is an initial marking vector of variant type i for the Petri net.

The behavior of any particular Petri net depends upon the rules applied to the interactions between positions and transitions, which can be of different types, and is based on the initial marking vector.

The invention provides mapping functions which relate the elements of a Petri net model to one or more matrices, which can be stored as tables, to permit automatic modeling and testing of software at all three levels of the software development cycle: system requirements, design requirements and implementation requirements, using the same model.

An extended Petri net model according to the invention can accordingly be expressed as follows:

(P', T', F', $M_0'$, C, E)

in which P', T', F', $M_0'$ constitute a generalized Petri net as described above, and wherein C is a map of associations between each position $p_i$ of the selected Petri net type and a natural language text description or mathematical expression of the condition the position reflects, and E is a map of associations between each transition of the selected Petri net type and a natural language text description or mathematical expression of the action that the transition represents.

By providing mapping functions C, E in this fashion, a connection is established between the positions and transitions in the Petri net model and the real-world equivalents expressed in a natural language or mathematical expression which readily correlates with the manner in which the system requirements are defined by the intended user of the software. This mapping retains its integrity throughout the SDLC and testing phases of the software. C and E can be stored in a reserved memory or in the external memory.

The mapping functions C, E according to the invention, explained in greater detail below, thus make it possible to correlate abstract concepts of the model with the real content of the modeling object (for example the system requirements, design requirements etc.). The method of the invention is thus universal, because it can be implemented in an extensive class of software objects on different levels of system hierarchies, and provides an extensive class of design, quality assurance and testing procedures. The implementation of the method of the invention provides considerable flexibility, as it provides for the creation of a family of models based on the basic universal concept.

The system requirements may be modeled automatically according to the method of the invention, where a formal or quasi-formal description the system requirements is available. The system requirements may be modeled manually where an informal description of the system requirements is available. The manner of modeling the system requirements is set out below.

To model the system requirements automatically, a formal expression of the system requirements is created from the informal (natural language) expression of the system requirements provided by the end user. The formal expression of system requirements may also use natural language to define the events in a particular routine; for example, the formalized expression of the routine may be in a Use Cases format as shown in Table 1. An example in a Use Case format is shown in Table 2 for a routine designed to permit an authorized customer to withdraw cash from an automated teller machine (ATM).

TABLE 1

| | |
|---|---|
| Name: | A short description of the Use Case. |
| Actor: | Anything that needs to exchange the information with the system. |
| Objective: | Description of what the Use Case should accomplish. |
| Preconditions: | The entrance criteria that the system must be in for the Use Case to execute. |
| Results (Post Conditions): | The expected completion criteria of the Use Case |
| Flow of events: | A series of declarative statements of a Use Case. The flow of events may consist of:<br>The basic Flow<br>Alternative Flows (can be shown by using branches of by listing them under the Alternative Flow)<br>Exceptions (errors or deviations that may occur that cause the actor to deviate from the basic course) |

Automatically Developing a Model of the System Requirements for Use Cases

The method according to the invention further formalizes the expression of the system requirements by dissociating alternative flows and exception flows from the basic flow of events; tagging significant events (which typically will include any precondition which has alternate post-conditions, but may also include selected events having some significance to the user); and relating alternate flows and exception flows to the precondition from which they branch off.

The flow of events, including a basic flow and alternative or exception flows, thus represents the system requirements for any particular Use Case. A representation of the system requirements is created as follows:

1. Tagging Significant Conditions.
1.1 In a Use Case table of the type illustrated in Table 2, significant conditions are identified and tagged with an indicator.

Preferably the significant conditions include each item i that is one of a plurality of output conditions. These conditional items may be identified, for example, by an "if" statement in the natural language text description. Other significant conditions which may be identified by the end user are tagged in similar fashion. Any indicator may be used to tag significant conditions, for example using an asterisk (*) as shown in Table 2, so that software embodying the modeling method of the invention can identify the significant conditions when generating the input and output matrices $A_I$, $A_O$.

TABLE 2

| | |
|---|---|
| Name: | Withdraw from checking. |
| Actor: | ATM Customer |
| Objective: | To allow a bank customer to withdraw cash from his/her account. |
| Preconditions: | ATM prompts - "Insert your bank card" |
| Results (Post Conditions): | ATM prompts - "Insert your bank card" |
| Flow of events: | |
| Basic Flow: | 1. Customer inserts his banking card<br>2. ATM prompts - "Enter the PIN"<br>3. *If Customer enters a valid PIN<br>4. ATM displays three choices:<br>   Deposit<br>   Withdraw<br>   Balance<br>5. Customer selects "Withdraw"<br>6. ATM prompts - "Enter amount"<br>7. Customer enters valid amount |

TABLE 2-continued

|  | 8. | ATM ejects the card |
| --- | --- | --- |
|  | 9. | ATM dispenses the cash, the amount equal to required |
| Alternative Flow: | 1. | (3) If customer enters invalid PIN |
|  | 2. | ATM prompts - "Invalid PIN, please re-enter" |
|  | 3. | Customer enters invalid PIN |
|  | 4. | ATM ejects the card |

FIG. 1 is a Petri net representation of the system requirements for the routine expressed in Table 2. Each system requirement, or condition, corresponds to a position $p_i$. In FIG. 1 the transitions $t_i$ are provided merely to connect the positions $p_i$, however in a more complex system each event could correspond to a transition $t_i$ that occurs when the input position(s) to the transition are true. The positions $p_{10}$ and $p_{15}$ are redundant positions created by the modeling method of the invention, as described in detail below.

In the example shown, which is a classical Petri net model, all input positions to a transition must be true in order for the transition event to occur (an AND transition). However, OR transitions, NOT transitions and other types of positions and transitions may also be implemented according to the method of the invention. Many variations of the classical Petri net will be known to those skilled in the art, including variations in the Petri net structure as well as variations in the types of (i.e. rules applied to) positions and transitions, which can equally be implemented with suitable variants.

2. Generating Input and Output Matrices Representing the Basic Flow of System Requirements.

In the Petri net model represented by (P', T', F', $M_0'$, C, E), as described above, the arc definition F' is replaced with an input matrix $A_I$ and an output matrix $A_O$, so that the basic Petri net representation of the software model becomes (P', T', $A_I$, $A_O$, $M_0'$, C, E). Using the numerical annotations assigned to the positions in the basic flow, the input matrix $A_I$ and output matrix $A_O$ are generated automatically as follows:

2.1 Determine the general number of items $N_g$ in the Basic Flow.

2.2 Determine the number of conditional items $N_c$ in the Basic Flow.

2.3 Select a number of rows N for each matrix $A_I$ and $A_O$ whereby $N=N_g+N_c$.

2.4 Select a number of columns for each matrix $A_I$ and $A_O$ equal to $N_g-1$.

2.5 Mark each intersection of $p_i$, $t_i$ of $A_I$, where i is from (1, $N_g-1$).

2.6 Mark each intersection of $p_{i+1}$, $t_i$ of $A_O$, where i is from (1, $N_g-1$).

FIGS. 2 and 3 respectively illustrate the input matrix $A_I$ and an output matrix $A_O$ corresponding to the flow of the system requirements illustrated in FIG. 1 and Table 2.

3. Mapping the Basic Flow and Processing Significant Positions 3.1 For each item i of the basic flow text, in one row assign a variable $p_i$ to the left column of the table and set out the corresponding natural language text description of the item i in the right column.

3.2 Add a redundant position corresponding to the significant condition to the input and output matrices $A_I$, $A_O$ and map the significant condition in the Table of Positions as follows:

3.2.1 Add a position $p_{Ng+1}$ to the input and output matrices $A_I$, $A_O$ and insert the position designator into the left column of the Table of Positions;

3.2.2 Mark the intersection of ($p_{Ng+1}$, $t_c$) of $A_i$ (where $t_c$ is the transition which has a marked intersection with the significant condition); and 3.2.3 Insert the natural language text of the conditional item i in the right column in the same row as the corresponding position $p_{Ng+1}$.

3.3 Repeat the steps of 3.2 for all other significant conditions ($p_{Ng+2}$, $p_{Ng+3}$, ... $p_{Ng+Nc}$).

FIG. 4 thus illustrates the Table of Positions corresponding to the input matrix $A_I$ and output matrix $A_O$ of FIGS. 2 and 3, respectively, containing the basic flow. The redundant position $p_{10}$ in the Petri net of FIG. 1 is created by step 3.3. Redundant position $p_{10}$ is the same condition as position $p_3$, which provides an opportunity to imitate a situation in which $p_3$ is satisfied, allowing artificial intervention into the modeling process at this point. The purpose of the redundant position will be described in greater detail below in the description of the testing method of the invention.

4. Incorporating Alternative Flows Into the Table of Positions With the Basic Flow.

The method of representing alternative flows is similar to the method for representing the basic flow described above. To add an alternative flow to the basic flow requires modification of the input and output matrices $A_I$, $A_O$ and the Table of Positions which were created for the basic flow. The position in the alternative flow is assigned a position indicator referencing the associated conditional item in the basic flow. For example, in Table 2 the position 1 in the alternative flow refers to tagged conditional item 3 in the basic flow, and is therefore assigned the indicator "(3)". For each particular alternative flow, modification of the input and output matrices $A_I$, $A_O$ is accomplished as follows:

4.1 Determine the number of items L in the alternative flow.

4.2 Add $P_{N+1}$ ... $P_{N+L}$ to the input and output matrices $A_I$ and $A_O$.

4.3 Add $t_{Ng}$ ... $t_{Ng+(L-2)}$ to the input and output matrices $A_I$ and $A_O$.

4.4 Determine the item in the alternative flow which has a reference to a tagged conditional item in the basic flow.

4.5 Mark the intersection of ($t_s$, $P_{(N+1)}$) in $A_0$ (where $t_s$ is the transition which has a marked intersection with the significant condition).

4.6 Mark the intersection of ($p_i$, $t_{i-Nc-1}$), where i is (N+1 ... (N+(L-1))) of $A_I$ (see FIG. 5).

4.7 Mark the intersection of ($p_{i+1}$, $t_{i-Nc-1}$), where i is (N+1 ... (N+(L-1))) of $A_0$ (see FIG. 6).

4.8 Map the items in the alternative flow by adding their position designations $p_{N+1}$ ... $p_{N+L}$ to the left column of the Table of Positions and insert the corresponding natural language descriptions into the right column of the Table of Positions (see FIG. 7).

4.9 Add the significant condition to the input and output matrices $A_I$, $A_O$ and map the significant condition in the Table of Positions as follows:

4.9.1 Add $p_{N+L+1}$ to the input and output matrices $A_I$ and $A_O$ and to the left column of the Table of Positions.

4.9.2 Mark the intersection ($p_{N+L+1}$, $t_{(Ng-1)+j}$) of $A_i$ where j is number of the item in the alternative flow which referred to the basic flow.

4.9.3 Add the text description of $P_{N+L+1}$ to the right column of the Table of Positions in the same row as $P_{N+L+1}$.

4.10 Repeat the steps of 4.9 for all other significant conditions ($p_{N+L+2}$, $p_{N+L+3}$ ... $p_{N+L+Nc}$).

FIG. 7 thus illustrates the Table of Positions corresponding to the input matrix $A_I$ and an output matrix $A_O$ of FIGS. 5 and 6, respectively. Redundant position $p_{15}$ is the same condition as position $p_{11}$, which provides an opportunity to imitate a situation in which $p_{11}$ is satisfied, allowing artificial intervention into the modeling process at this point. Exceptions can be represented as alternative flows in the same fashion, since exceptions are essentially alternative flows that apply in specific conditions.

FIGS. 5 and 6 respectively illustrate the input matrix $A_I$ and an output matrix $A_O$ corresponding to the basic flow and alternative flow, including conditional items $p_{10}$ and $p_{15}$ of the system requirements listed in Table 2. FIG. 7 illustrates the Table of Positions generated from the matrices of FIGS. 5 and 6.

Thus, a Petri net model is automatically generated, and with P', T', F', $A_I$, $A_O$, and C so determined, $M_0'$ is readily apparent (the transition mapping function E is not used in this example).

Developing a Model of the System Requirements Manually

The system requirements may be set out, informally in a natural language, in a requirements document. The Requirements document is analyzed to identify conditions (which may or may not be satisfied), and activities (events) which satisfaction of any particular condition(s) can cause. As will be appreciated by those skilled in the art, that satisfaction of a set of conditions will cause specified activities to occur, which will in turn create new conditions that cause further activities to occur, and so on.

Where at the system level requirements are represented informally as text document written in a natural language (for example English), a model according to the invention can be developed manually as follows:

Analyze the Requirements document to identify each condition and the events which satisfaction of this condition can cause, as follows:

1.1 Determine in the requirement document the first event in the described system and assign to it a variable $t_1$.

1.2 Determine the condition or group of conditions which will cause the event $t_1$ and assign to them variables $p_1 \ldots p_k$, where k equals the number of conditions.

1.3 Complete the input matrix $A_I$ by marking (for example with a numeral "1") each intersection of $p_i$, $t_1$, where i is in the set (1 . . . k)

1.4 Complete the Table of Positions by entering a position number into the first column and the corresponding text description into the second column.

1.5 Determine the condition or group of conditions which result from the occurrence of event $t_1$. This may consist of new conditions and/or existing conditions (already entered in the Table of Positions).

1.6 Assign to all new conditions variables $p_{k+1} \ldots p_r$ where r–k is the number of new conditions. For old conditions use the same designations already entered in the Table of Positions.

1.7 Repeat steps 1.1 to 1.6 for each event in the system and the conditions which are associated with it, as described in the Requirements document.

The results are mapped in an input matrix $A_I$ and an output matrix $A_O$, as described above. The input and output matrices $A_I$ and $A_O$ form the basic mathematical representation of the Petri net model. Thus, with P', T', F', $A_I$, $A_O$ and C so determined, $M_0'$ is readily apparent. The Requirements Document is now represented by an abstract model which can be run with different inputs and the results analyzed to resolve the required tasks.

Using the automatic teller machine withdrawal example, the requirements document can describe the required operation of the ATM as follows. "If a customer inserts a bank card and enters a valid PIN, then the ATM should offer three options: "DEPOSIT", "BALANCE", "WITHDRAW". The customer may choose by entering the name of this option. If customer chooses "WITHDRAW" then the ATM prompts the customer to enter the dollar amount. If customer the enters a valid amount then ATM should eject the bankcard and dispense the cash."

The input and output matrices $A_I$ and $A_O$ generated by this description might look as follows:

|  | t1 | t2 | t3 |
| --- | --- | --- | --- |
| $\underline{A_I:}$ |  |  |  |
| p1 | 1 |  |  |
| p2 | 1 |  |  |
| p3 |  |  |  |
| p4 |  |  |  |
| p5 |  | 1 |  |
| p6 |  | 1 |  |
| p7 |  |  | 1 |
| p8 |  |  | 1 |
| p9 |  |  |  |
| p10 |  |  |  |
| $\underline{A_O}$ |  |  |  |
| p1 |  |  |  |
| p2 |  |  |  |
| p3 | 1 |  |  |
| p4 | 1 |  |  |
| p5 | 1 |  |  |
| p6 |  |  |  |
| p7 |  | 1 |  |
| p8 |  |  |  |
| p9 |  |  | 1 |
| p10 |  |  | 1 | with positions assigned to the text descriptions in a Table of Positions as follows:

| Pos. # | Text Description |
| --- | --- |
| p1 | Customer enters bankcard |
| p2 | Customer enters valid PIN |
| p3 * | ATM offers option "DEPOSIT" |
| p4 | ATM offers option "BALANCE" |
| p5 | ATM offers option "WITHDRAW" |
| p6 | Customer chose "WITHDRAW" |
| p7 | ATM offers to enter "AMOUNT" |
| p8 | Customer enters valid "AMOUNT" |
| p9 | ATM should eject the bankcard |
| p10 | ATM dispense the cash. |

Thus, if the Requirements document described the behavior of the ATM for the case of entering an invalid PIN, and the sequence of customer activities, the resulting model would be a very similar to the Use Cases model.

Creating a Requirements Table for Automated Model Development

An informal expression of the system requirements can be converted into a Requirements table from which a model according to the invention can be developed automatically.

For example, the table might follow the format of Table 3 and use following definitions:

$N_{gr}$ is a number of the group of a set of causes and dependent effects $N_c$ is an ordered number of the cause;

$N_e$ is a ordered number of the effect (a single numeration is used for both causes and effects).

TABLE 3

| Ngr | Nc | Causes | Ne | Effects |
|---|---|---|---|---|
| 1 | i<br>j | Causes for some effect<br>(set of effects) | k<br>m | Effects |
| 2 | ... | ... | ... | ... |

$N_c$ and $N_e$ may be the same or can be repeated.

Table 4 thus provides an example of the Requirements table using the example of the automatic teller withdrawal routine.

TABLE 4

| Ngr | Nc Causes | Ne Effects |
|---|---|---|
| 1. | 1. Customer inserts bank card<br>2. Customer enters valid pin | 3. ATM offers the "DEPOSIT" option<br>4. ATM offers the "BALANCE" option<br>5. ATM offers the "WITHDRAW" option |
| 2. | 5. ATM offers option "WITHDRAW"<br>6. Customer chose "WITHDRAW" | 7. ATM offers to enter "AMOUNT" |
| 3. | 7. ATM offers to enter "AMOUNT"<br>8. Customer enters valid "AMOUNT" | 9. ATM should eject the bankcard<br>10. ATM dispense the cash. |

This Requirements table can then be automatically transformed to a model in the form (P', T', F', $M_0$', C, E) for modeling according to the method of the invention, as follows:

1.1 Determine in the requirement table the current group of causes and effects and assign to it variable $t_j$, where $j=N_{gr}$.

1.2 Determine the group of causes for this group and assign to them variables $p_i$, where I is a number of the cause in the requirements table.

1.3 Fill in $A_I$ by marking each intersection $(p_i, t_j)$.

1.4 Fill in the Table of Positions by entering $P_i$ into the first column and the natural language text descriptions corresponding to $P_i$ into the second column of the same row.

1.5 Determine a group of effects, listed in the second column of the requirements table, and assign to them variables $P_k$ where k is the number of the effect in the requirements table.

1.6 Repeat steps 1.1 to 1.5 for each group of causes and effects described in the Requirements table.

Figure 12:
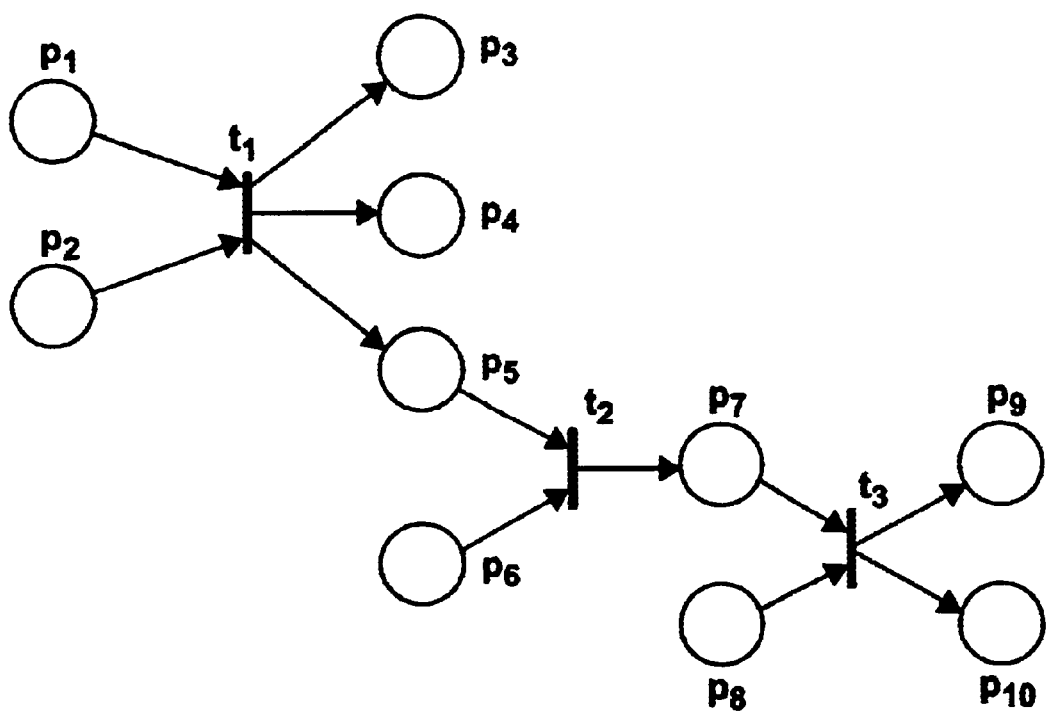
FIG. 12 is a Petri net representation of the requirements table of Table 4.

This method allows the system requirements model according to the invention to be generated automatically from the Requirements table. A graphical representation of the resulting model is shown in FIG. 12.

6. Generating Tests for the System Requirements

Tests are automatically generated for the system requirements model according to the invention by analyzing the preconditions, post-conditions and activities occurring between "free ends" within the Petri net.

Each branch in the Petri net extends between a starting position which has no input transition event and a terminal position which has no output transition event. The branch consists of the starting position, the terminal position and intermediate positions between the starting position and the terminal position, and includes the transitions interposed therebetween. By reverse Petri net analysis, it can be determined whether the terminal position (post-condition) in a Petri net segment is the result of the state of the starting position (precondition), regardless of the number of positions and transitions between the starting position and the terminal position.

Methods of analyzing Petri nets are well known to those skilled in the art, and may be selected and implemented in accordance with the particular test sought to be conducted on the software model.

The test method of the invention is based on reverse analysis of the extended Petri net model, involving the following steps:

6.1. Create a test prototype Matrix of Positions in the format of Table 5 as follows:

TABLE 5

| Inputs | Outputs |
|---|---|
| $P_d$<br>$P_s$ | $P_r$<br>$P_e$<br>$P_p$ |

Where $P_r$, $P_s$, $P_d$, $P_e$ and $P_p$ are determined as follows:

6.2. Consider $A_I$ and determine $t_M$, where M=max (i) for the set of $t_i$ in $A_I$. Insert the output position $P_r$ for this transition into the first row of the "Outputs" of Table 5.

6.3. Determine the input position $p_k$ for the determined transition, determined by a marked intersection of $(t_M, p_k)$ in $A_I$.

6.4. Determine the input transition $t_j$ for the position $p_k$, determined by a marked intersection of $(t_j, p_k)$ in $A_O$.

6.5. Determine the input position $P_m$ for the input transition $t_j$ by a marked intersection of $(t_j, P_m)$ in $A_I$.

6.6. Where any transition has more than one input position (i.e. there are two marked intersections in $A_I$ for the transition ), and only one of the input positions for that transition does not have an input transition then:

6.6.1. Determine which of the input positions $P_d$ does not have an input transition (by reference to $A_O$) and insert the position $P_d$ in the "Inputs" column of the Matrix of Positions;

6.6.2 Determine output position(s) $P_c$ for the output transition of the position $P_d$ and insert these output position(s) $P_e$ into the corresponding row of the "Outputs" column in the Matrix of Positions.

6.7. Repeat steps 6.4, 6.5 and 6.6 using corresponding numbers of positions and transitions until reaching a transition $t_i$ which has only starting input position(s) $P_s$ with no input transitions for any of the starting position(s). The starting position $P_s$ is the input condition for the Petri net branch, and is inserted into the "Inputs" column of the Matrix of Positions;

6.8 Determine output position(s) $P_p$ for the output transition of the position $P_s$ and insert $P_p$ into the corresponding row of the "Outputs" of the Matrix of Positions.

6.9. To develop a test case which follows the sequence of the system requirements, create Table 6 by inverting the information from Table 5 and replacing the position designations with the corresponding text descriptions.

TABLE 6

| Inputs | Expected Outcomes |
|---|---|
| Text $P_s$<br>Text $P_d$ | Text $p_p$<br>Text $p_e$<br>Text $p_r$ |

If more detailed information regarding intermediate events is required, (for case of modeling and testing GUI, for example), information about all positions and their connections can be recorded in the Matrix of Positions. The resulting Table 6 will represent a test case with detailed information of the test inputs and their expected results.

Test cases for other Petri net segments are created in exactly the same way (steps 6.1 to 6.9). In step 6.2 the transition $t_N$, where N=MAX(i), is determined for the remaining transitions which were not previously considered. The proposed methods allow for detailed tracking between test cases and branches of the Use Case, which is critical to the reliability of software development and quality assurance. The method of the invention allows not only for automatic generation of test cases, but also for automatic generation of test documentation.

Tables 7 and 8 show the Matrix of Positions and the inverted test case results for the alternative branch in the Use Case example of Table 2.

TABLE 7

| Inputs | Outputs |
|---|---|
|  | $P_{14}$ |
| $P_{15}$ | $P_{12}$ |
| $P_1$ | $P_2$ |

TABLE 8

| Inputs | Expected Outcomes |
|---|---|
| Customer inserts the bank card | ATM prompts "Enter PIN' |
| Customer enters invalid PIN | ATM displays: "The PIN you have entered is invalid" |
|  | ATM ejects the card |

Modeling the Design and Implementation Requirements

The design and implementation levels of the SDLC deal with algorithms and code, respectively. Each is essentially composed of a number of fragments having input and output conditions linked by either a processing step or a decision step, or both. These fragments can conventionally be represented by flow charts, showing the flow of preconditions, processing/decision, and post-conditions.

According to the invention, the conventional flow chart model of program code is represented as a Petri net model consisting of positions, which represent the input and output conditions; transitions, which represent processing steps that perform operations; and unified condition fragments (UCF), which represent decisions steps having branches for positive and negative decisions and redundant positions for each branch.

Figure 9:
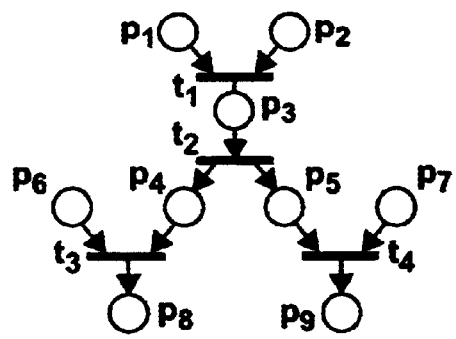
FIG. 9 is a Petri net representation of the flow chart of FIG. 8.

FIG. 8 shows a conventional flow chart model of a design level algorithm in a computer program. FIG. 9 shows a Petri net representation using a UCF according to the invention. Positions $p_1$ and $P_2$ respectively represent the input conditions a, b; $p_3$ represents the output of the processing block (C=a+b); the remainder of the Petri net model of FIG. 9 is a UCF which represents the decision block (C>0). Positions $p_6$ and $p_7$ are redundant positions, added during the software modeling process to create starting positions that serve as "free ends" for testing using the reverse Petri net analysis described above.

These positions, transitions and UCF(s) are connected the same way as the blocks in the conventional algorithm, similar to the configuration at the system requirements level.

Table 9 is a mapping of positions (variables) C and Table 10 is a mapping of transitions (operations) E corresponding to the algorithm in the flow chart of FIG. 8.

TABLE 9

| P1 | A |
| P2 | B |
| P3 | C |
| P4 | C > 0 |
| P5 | Not c > 0 |
| P6 | C > 0 |
| P7 | Not c > 0 |
| P8 | "Hello" |
| P9 | "Bye" |

TABLE 10

| t1 | C = a + b |
| t2 | C > 0 |
| t3 |  |
| t4 |  |

This model, created at the design and implementation requirements levels from algorithms or even program code, is effectively the same as the system requirements model. As such, the method of the invention can be applied to modeling the development of a software program at all levels of the SDLC. The method of the invention can also be used to generate tests of the design and implementation requirements, in the same fashion as the test generation in the system requirements level.

Test Generation for the Design and Implementation Levels

In the method of the invention, the Petri net models are hierarchical. Each transition $t_i$ in the Petri net model of the system requirements, i.e. each event that is the result of one or more satisfied input conditions, can be expressed as a further Petri net on a more detailed level. Thus, for example, in FIG. 1 the transition $t_2$ "contains" one or more models representing the design requirements, or algorithms, necessary to effect the transition between $p_2$ and $p_3$. These models can equally be represented as Petri nets, the starting conditions for which are dependent upon the input position $p_3$ being satisfied.

Likewise, each transition in the design requirements Petri nets "contains" one or more models representing the implementation requirements, in terms of code, necessary to effect the algorithms of the design requirements. The modeling and test generation methods described above in relation to the system requirements can be implemented in exactly the same fashion in each of the higher level (more detailed) hierarchies of the design and implementation requirements models. The model is thus hierarchical, having one or more lower level models contained within one or more transitions of a higher level model, and the system of the invention can accordingly be applied universally, at each stage of the SDLC.

The test method described in relation to the system requirements can thus be implemented, and automated, in the same manner as described above for the design requirements. For example, FIG. 11 shows a Petri net implementation for the algorithm of FIG. 10 using the automatic teller withdrawal example. The design level (algorithm) mapping of positions are set out in Table 11.

TABLE 11

| | |
|---|---|
| P1 | PINC |
| P2 | PINC = PINB |
| P3 | PINC not = PINB |
| P4 | PINC = PINB |
| P5 | PINC not = PNB |
| P6 | ATM displays three choices |
| P7 | ATM ejects the card. |

Figure 10:
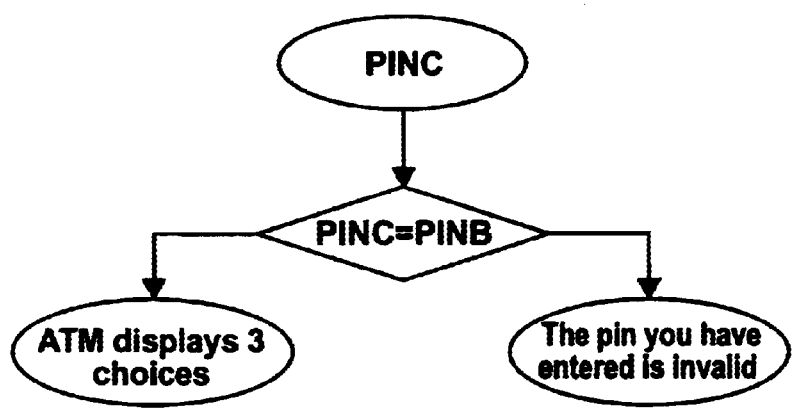
FIG. 10 is a conventional flow chart model of an algorithm.
Figure 11:
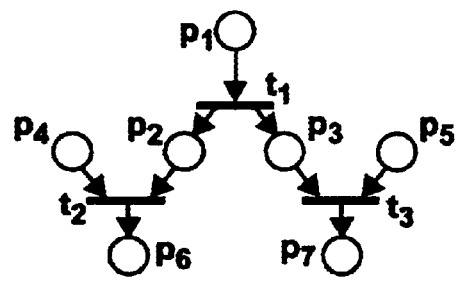
FIG. 11 is a Petri net representation of the algorithm of FIG. 10.

The mapping of positions in the algorithm of FIG. 10 is shown in Table 12, and Table 13 shows the actual test prototype in design level terms, created by mapping the positions back to their corresponding requirements.

TABLE 12

| Inputs: | Outputs: |
|---|---|
| P5 | P7 |
| P1 | |

TABLE 13

| Inputs: | Expected Outputs: |
|---|---|
| PINC | |
| PINC not = PIN B | "The PIN you have entered is invalid" |

The testing method of the invention thus allows for the automated development of test documentation.

A preferred embodiment of the invention having been thus described by way of example, adaptations and modifications will be apparent to those skilled in the art. The invention includes all such adaptations and modifications as fall within the scope of the appended claims.

I claim:

1. A method of developing a model of a computer program implementing specified requirements, the method comprising the steps of
   a. applying positions to statements in the requirements,
   b. mapping the positions to the corresponding statements to create a table of positions,
   c. adding transitions between the positions,
   d. identifying significant positions which are positions defining points for test development,
   e. adding as an input to each transition immediately following a significant position a redundant position having no input transition, the state of which controls activation of its output transition, and
   f. mapping the redundant positions in the table of positions.

2. The method of claim 1 further comprising the step of generating an input matrix of positions against transitions in which an intersection of each transition and its associated input position is marked.

3. The method of claim 2 further comprising the step of generating an output matrix of transitions against positions in which an intersection of each transition and its associated output position is marked.

4. The method of claim 1 further comprising the step of tagging the significant positions.

5. The method of claim 1 further comprising the step of assigning a reference designation associating one or more alternative output positions with respective significant positions.

6. The method of claim 1, wherein the statements are divided into conditions and events and positions are applied to conditions and further comprising the steps of applying transitions to events and mapping the transitions in a table of transitions relating the transitions to the corresponding events.

7. The method of claim 1 further comprising the step of developing a test based on a segment of the model by reverse analysis from a position having no output transition to a redundant position.

8. The method of claim 7 further comprising the step of mapping positions back to their corresponding requirements.

9. The method of claim 7 further comprising the step of testing design level algorithms using one or more tests generated from system requirements.

10. The method of claim 7 further comprising the step of testing implementation level code using tests generated from system requirements or design algorithms.

11. The method of claim 1 wherein the statements are system level requirements described in a natural language or design level requirements described as algorithms.

12. The method of claim 1 wherein the model is a hierarchical Petri net model extended by mapping.

13. A computer program product for use with a computer, the computer program product comprising a computer usable medium having computer readable program code means embodied in said medium for generating a model of a computer program implementing specified requirements comprising a series of statements, said computer program product having
   a. computer readable program code means for mapping positions in a Petri net to the statements to create a table of positions,
   b. computer readable program code means for identifying one or more significant positions which are positions defining segments of the model which can be independently analyzed,
   c. computer readable program code means for adding as an input to each transition immediately following a significant position a redundant position having no input transition, the state of which controls activation of its output transition, and
   d. computer readable program code means for mapping the redundant positions in the table of positions.

14. The computer program product of claim 13 further comprising computer readable program code means for generating an input matrix of positions against transitions in which an intersection of each transition and its associated input position is marked.

15. The computer program product of claim 14 further comprising computer readable program code means for generating an output matrix of transitions against positions in which an intersection of each transition and its associated output position is marked.

16. The computer program product of claim 13 further comprising computer readable program code means for developing a test based on a segment of the model by reverse analysis from a position having no output transition to a redundant position.

17. The computer program product of claim 16 further comprising computer readable program code means for analyzing results of the test development by replacing positions between the position having no output transition to the redundant position with a description of their respective statements.

18. The computer program product of claim 13 wherein the statements are system level requirements described in a natural language or design level requirements described as algorithms.

19. The computer program product of claim 13 wherein the model is a hierarchical Petri net model extended by mapping.

20. A method of test development for a computer program having program code and designed to implement requirements comprising conditions and events, to verify concordance between the computer program and the requirements, the method comprising the steps of
   a. mapping the conditions and events to a set of positions and transitions comprising at least one starting position which has no input, at least one terminal position which has no output, and intermediate positions and transitions connected between the starting position and the terminal position,
   b. identifying one or more significant positions that are significant for test development,
   c. adding as an input to each transition immediately following a significant position a redundant position having no input transition, the state of which controls activation of its output transition,
   d. conducting a reverse analysis of at least a portion of the requirements from a terminal position to generate a table of positions comprising, in sequence, the terminal position, positions between the terminal position and the starting position, and the starting position, and
   e. inverting information in the table of positions and reverse mapping from positions to statements to generate a natural language test.

21. A method of modelling user requirements, said method comprising:
   acquiring information regarding the user requirements;
   dividing the information regarding user requirements into statements having a natural language format;
   mapping positions to the statements;
   identifying one or more significant positions, wherein the significant positions comprise positions mapped to condition statements, positions mapped to other statements relevant to test development, and positions mapped to other statements selected by a user;
   mapping significant positions within the basic flow and alternative flows to associated significant positions within the basic and alternative flows;
   generating a Petri net that models the basic flow and alternative flows using the positions and transitions added between the positions;
   adding redundant positions to the Petri net that are associated with each significant position that represents a condition statement, wherein the redundant positions have no input transition and a marking of each redundant position controls activation of the associated significant position's output transition; and
   generating input and output matrices of positions and transitions within the extended Petri net.

22. The method of claim 21, further comprising:
   generating a flowchart of the user requirements based on the extended Petri net.

23. The method of claim 21, further comprising:
   generating tests for a computer program application based on the user requirements by reverse analysis of the extended Petri net and reverse mapping from positions to statements.

24. The method of claim 23, wherein said tests relate to system requirements, design requirements and implementation requirements for the computer program application.

25. The method of claim 21, further comprising:
   simulating a computer program application based on the user requirements by using the extended Petri net, wherein the simulation utilises the reverse mapping of positions to statements to present a user with the statements having a natural language format.

26. The method of claim 25, further comprising:
   generating a flowchart of the user requirements based on the extended Petri net; and
   presenting the user with the flowchart simultaneously with the statements.

27. The method of claim 21, wherein said verification comprises:
   moving through the extended Petri net in a step-by-step manner and using reverse mapping of positions to statements to present a user with statements.

28. The method of claim 21, wherein the Petri net analysis comprises Petri net simulation.

29. A computer program product for modeling user requirements, the computer program product comprising a computer usable medium having computer readable program code embodied therein, wherein when said computer readable program code is executed in a computer, said computer readable program code causes said computer to:
   acquire information regarding the user requirements;
   divide the information regarding user requirements into statements having a natural language format;
   map positions to the statements;
   identify one or more significant positions, wherein the significant positions comprise positions mapped to condition statements, positions mapped to other statements relevant to test development, and positions mapped to other statements selected by a user;
   map significant positions within the basic flow and alternative flows to associated significant positions within the basic and alternative flows;
   generate a Petri net that models the basic flow and alternative flows using the positions and transitions added between the positions;
   add redundant positions to the Petri net that are associated with each significant position that represents a condition statement, wherein the redundant positions have no input transition and a marking of each redundant position controls activation of the associated significant position's output transition; and
   generate input and output matrices of positions and transitions within the extended Petri net.

30. The computer program product of claim 29, wherein said computer readable program code further causes said computer to:
   generate tests for a computer program application based on the user requirements by reverse analysis of the extended Petri net and reverse mapping from positions to statements.

31. The computer program product of claim 29, wherein said computer readable program code further causes said computer to:
   simulate a computer program application based on the user requirements by using the extended Petri net, wherein the simulation utilises the reverse mapping of positions to statements to present a user with the statements having a natural language format.

* * * * *